US006894856B2

(12) United States Patent
Nakamura et al.

(10) Patent No.: US 6,894,856 B2
(45) Date of Patent: May 17, 2005

(54) MAGNETIC RECORDING MEDIUM, MAGNETIC RECORDING APPARATUS USING THE SAME, AND METHOD AND APPARATUS FOR MANUFACTURING THE MAGNETIC RECORDING MEDIUM

(75) Inventors: Atsushi Nakamura, Kodaira (JP); Yoshio Suzuki, Tokyo (JP); Kiwamu Tanahashi, Kokubunji (JP); Yuko Tsuchiya, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 10/601,979

(22) Filed: Jun. 24, 2003

(65) Prior Publication Data

US 2004/0106009 A1 Jun. 3, 2004

(30) Foreign Application Priority Data

Nov. 28, 2002 (JP) ........................................ 2002-346124
Mar. 26, 2003 (JP) ........................................ 2003-086318

(51) Int. Cl.$^7$ ................................................. G11B 5/02
(52) U.S. Cl. ........................................ 360/55; 360/131
(58) Field of Search .................. 360/50, 131, 317–319, 360/15–17, 119, 122, 125; 428/694 DA, 694 T, 694 TH, 694 BM

(56) References Cited

U.S. PATENT DOCUMENTS

| 4,656,546 A |   | 4/1987 | Mallory |
|---|---|---|---|
| 5,534,324 A | * | 7/1996 | Sugita et al. ............ 428/694 T |
| 5,761,012 A | * | 6/1998 | Cumpson et al. ........... 360/119 |
| 5,796,533 A | * | 8/1998 | Kitaori et al. ................ 360/17 |

FOREIGN PATENT DOCUMENTS

| JP | 58-128023 | 1/1982 |
|---|---|---|
| JP | 9-212855 | 2/1996 |
| JP | 2001-14664 | 6/1999 |
| JP | 2000-48340 | 7/1999 |
| JP | 2002-109729 | 9/2000 |

OTHER PUBLICATIONS

K. Ozawa and M. Takahashi, "Iron Thin Film Magnetic Recording Tape By Vacuum Deposition", IEEE Transactions on Magnetics, vol. Mag–19, No. 5, Sep. 1983, pp. 1635–1637.

Kiyoshi Yamakawa, Kazuyuki Ise, Shingo Takahashi, and Kazuhiro Ouchi, "A New Single– Pole Head Structure for High Writability", IEEE Transactions on Magnetics, vol. 38, No. 1, Jan. 2002, pp. 163–168.

M. Mallary, A. Torabi, and M. Benakli, "One Terabit per Square Inch Perpendicular Recording Conceptual Design", IEEE Transactions on Magnetics, vol. 38, No. 4, Jul. 2002, pp. 1719–1724.

(Continued)

Primary Examiner—Alan T. Faber
(74) Attorney, Agent, or Firm—Reed Smith LLP; Stanley P. Fisher, Esq.; Juan Carlos A. Marquez, Esq.

(57) ABSTRACT

A magnetic recording apparatus provides improved resolution and S/N without adversely affecting thermal stability. An angle formed by the direction of easy magnetization of a recording layer and the direction normal to a magnetic recording medium is in the range between 5° and 55°, the easy magnetization direction is from a back surface of the recording layer toward a front surface thereof, and when a recording track direction is from the upstream of the direction of transportation of the medium toward the downstream thereof, an angle formed by the direction of a projection of the easy magnetization direction on the medium plane and the recording track direction is in the range between 0° and 70°.

10 Claims, 10 Drawing Sheets

OTHER PUBLICATIONS

Weixing Xia, Hiroaki Muraoka and Yoshihisa Nakamura, "High-Field Gradient Single-Pole With an Improved Pole Structure", IEEE Transactions on Magnetics, vol. 38, No. 5, Sep. 2002, pp. 2216–2218.

Kai-Zhong Gao and H. Neal Bertram, "Magnetic Recording Configuration for Densities Beyond 1 Tb/in$^2$ and Data Rates Beyond 1 Gb/s", IEEE Transactions on Magnetics, vol. 38, No. 6, Nov. 2002, pp. 3675–3683.

* cited by examiner

MAGNETIC RECORDING MEDIUM, MAGNETIC RECORDING APPARATUS USING THE SAME, AND METHOD AND APPARATUS FOR MANUFACTURING THE MAGNETIC RECORDING MEDIUM

BACKGROUND OF THE INVENTION

1. Field of the Invention

The present invention relates to a magnetic recording medium characterized by its direction of easy magnetization, a magnetic recording apparatus on which the recording medium is mounted, and a method and apparatus for manufacturing the magnetic recording medium.

2. Background Art

In order to obtain increased areal density in magnetic recording apparatus, a perpendicular magnetic recording technique has been proposed to replace the conventional longitudinal magnetic recording technique. In perpendicular magnetic recording, the direction of recorded magnetization created in a recording medium is perpendicular to a film plane. This technique has the advantage that the fine recorded magnetization is thermally stable. As the magnetic head for perpendicular magnetic recording, a dual element write-read head can be considered. The read head employs a magnetoresistive head that is conventionally used in longitudinal magnetic recording. The write head can employ a single pole type ("SPT") head comprised of a main pole and an auxiliary pole. By employing a double-layer perpendicular recording medium comprising a recording layer and an underlayer of soft magnetic material formed on the back surface of-the recording layer, the SPT head can advantageously produce a stronger magnetic field than a ring-type head that is conventionally used in longitudinal magnetic recording. While there is a need to improve the perpendicular magnetic recording properties such as, for example, resolution and S/N, if the average grain size of the recording layer is reduced to improve S/N, or if the thickness of the recording layer is reduced to obtain a steeper head field gradient and thereby improve resolution, the thermal stability of the recording medium is adversely affected.

Another example of magnetic recording is oblique magnetic recording that is widely used in magnetic tape media. This is a technique in which the direction of recorded magnetization is inclined with respect to the direction normal to the film plane, and in which a ring head is used for recording. It can achieve a high SIN recording. In the case of magnetic tape media, it is well known that different recording characteristics are obtained when the direction in which recorded magnetization is inclined is reversed with respect to the direction of recording tracks. Specifically, when the direction of recorded magnetization is from the back surface of the tape medium toward the front surface thereof and the direction of recording tracks is from the upstream of the direction of transportation of the tape medium to the downstream thereof, better recording characteristics are obtained when the direction of recorded magnetization as projected on the tape medium plane is opposite that of the recording tracks. This is described in IEEE Transactions on Magnetics, MAG-19 (1983), pp. 1635–1637, for example. An attempt to apply this oblique recording technique to disc media is disclosed in JP Patent Publication (Kokai) No. 58-128023 A (1983). This publication teaches that when a ring head is used for recording, an improved reproduced output can be obtained when a projection of the longitudinal axis of the needle-like particles forming a magnetic recording medium on the substrate surface is substantially parallel to the circumference of the disc while, at the same time, the longitudinal axis is inclined with respect to a line normal to the substrate surface by 45° or more. Further, JP Patent Publication (Kokai) No. 9-212855 A (1997) describes the effect of inclining the axis of easy magnetization when a medium having an underlayer is recorded using an SPT head. According to this publication, an improved S/N can be obtained when a projection of the axis of easy magnetization on the magnetic recording medium is inclined by 90° with respect to the direction of tracks. None of these prior art documents, however, analyze the effect of the relationship between the transport direction of the magnetic recording medium and the direction of inclination of the axis of easy magnetization.

A conventional method of manufacturing magnetic recording media, such as longitudinal or perpendicular magnetic recording media, involves the deposition of a thin film of a magnetic material for forming a magnetic recording medium on a substrate by physical vapor deposition, such as vacuum deposition or sputtering. In a longitudinal magnetic recording medium, a recording layer is formed by epitaxial growth on the surface of an underlayer whose crystal orientation is controlled, and the crystals are oriented such that the axis of easy magnetization is parallel to the film surface. In the film plane, the individual crystal particles either have generally random axes of easy magnetization, or are provided with a weak anisotropy so that the magnetization is predisposed to be directed toward the circumference of the disc-shaped magnetic recording medium. The latter is realized by employing a substrate on the surface of which fine grooves called texture are mechanically formed. However, in order to improve recording density, the spacing between the magnetic head and the magnetic recording medium must be reduced. For example, JP Patent Publication (Kokai) Nos. 2001-14664 A and 2002-109729 A disclose techniques of providing circumferential anisotropy by employing a smooth substrate without texture and controlling the direction of the traveling particles during the formation of the thin film such that it is inclined away from a line normal to the substrate and toward the circumference.

A totally different manufacturing method is disclosed in JP Patent Publication (Kokai) No. 2000-48340 A, whereby magnetic nanoparticles are arranged in an ordered manner. This publication, however, does not describe the method of controlling the magnetic anisotropy of particles.

As mentioned above, the head for perpendicular magnetic recording comprises an SPT head comprised of a main pole and an auxiliary pole is used. A head structure has been proposed for improving the field gradient of the SPT head, in which a shield made of soft magnetic thin film is disposed near the main pole. Examples are disclosed in U.S. Pat. No. 4,656,546 and IEEE Transactions on Magnetics, Vol. 38 (2002), pp. 163–168, pp. 1719–1724, and pp. 2216–2218. The heads described in these publications are for perpendicular magnetic recording and are not for media with an inclined axis of easy magnetization. These prior art publications mention that the head of this type can provide a steeper field gradient than the conventional SPT head. However, they either make little mention about the reduction of magnetic field strength, or state that the reversal of magnetization of the perpendicular magnetic recording medium would be easier due to the increase in the in-plane components of magnetic field, or that the magnetic field strength could be ensured by making the main pole thicker and reducing the head-media spacing.

In the prior art, there has not been proposed a method of improving resolution and S/N without adversely affecting the thermal stability in the perpendicular magnetic recording technique in which a medium having an underlayer is recorded using an SPT head. Further, in the art of recording a medium having an underlayer in which the axis of easy magnetization is inclined with respect to a line normal to the medium, there has been no analysis of the case when the transportation direction of the medium is nearly parallel to the direction of a projection of the direction of easy magnetization on the medium plane.

Furthermore, in the above-mentioned prior art, when a perpendicular magnetic recording medium having an underlayer is recorded using an SPT head with the structure in which a shield made of soft magnetic thin-film is disposed near the main pole, sufficient magnetic strength cannot be obtained. If a material with a large magnetic anisotropy is employed for the recording medium in order to allow magnetic recording to be carried out at high areal density without damaging the thermal stability, satisfactory recording cannot be carried out in the perpendicular recording technique.

SUMMARY OF THE INVENTION

It is therefore an object of the invention to provide a magnetic recording medium with high resolution and S/N that has thermal stability comparable to that of the conventional perpendicular magnetic recording media. Another object of the invention is to provide a magnetic recording apparatus for achieving higher areal density using the magnetic recording medium than the conventional perpendicular magnetic recording apparatus. It is yet another object of the invention to provide a method and apparatus for manufacturing the magnetic recording medium.

To achieve the objects, the invention provides a magnetic recording medium comprising at least a soft magnetic underlayer and a recording layer. The direction of easy magnetization of the recording layer is inclined from the direction normal to the medium. When the easy magnetization direction is from the back surface of the recording layer to the upper surface thereof, and the direction of recording tracks is from the upstream of the direction of transportation of the medium toward the downstream thereof, the direction of the projection of the easy magnetization direction on the medium plane substantially coincides with the recording track direction. This is opposite the direction that is suitable in the case of the combination of a tape medium and a ring head, as described above. The angle formed by the direction of the projection of the easy magnetization direction on the medium plane and the recording track direction may be not more than 70°. The easy magnetization direction is characteristically inclined from the normal direction of the medium by an angle of not less than 5° and not more than 55°.

The magnetic recording apparatus according to the invention records information on this medium using an SPT head. The apparatus comprises at least an SPT head, a slider on which the SPT head is mounted, a suspension arm for securely fastening the slider, and an actuator for supporting the suspension arm. The SPT head can be transported to an arbitrary position on the disc-shaped rotating recording medium by the movement of the actuator where it can record information. The SPT head includes at least a main pole and an auxiliary pole. It may further include a shield disposed mainly downstream of the direction of transportation of the medium relative to the main pole, the shield having a wider width than the main pole. When an SPT head with a shield is used, the angle formed by the easy magnetization direction of the recording layer and the direction normal to the medium should preferably be not less than 15° and not more than 55°.

The magnetic recording medium of the invention can be manufactured by roughly two kinds of methods. One is similar to the conventional method of manufacturing longitudinal or perpendicular magnetic recording media, whereby a thin film of a magnetic material forming the medium is deposited on a substrate by physical vapor deposition such as vacuum deposition or sputtering. The magnetic recording medium of the invention can be manufactured by allowing deposition or sputtering particles to be incident in a direction inclined from the direction normal to the substrate. Specifically, a mask plate, for example, may be placed between a target and the substrate that passes only those particles flying from the target toward the substrate by the conventional sputtering technique that are inclined by a certain angle from the direction normal to the substrate. In this case, a uniform film can be obtained on the entire substrate surface by rotating the substrate and the target during film formation. The inventive magnetic recording medium can also be manufactured without using the mask plate or a slit by a sputtering method such as ion beam sputtering that provides directional sputtering particles, while rotating the substrate.

Another conceivable method involves the use of a thin film of an intermetallic compound in the recording layer that has an $L1_0$-type crystal structure, in which a disordered alloy is ordered by thermal treatment to exhibit ferromagnetism. According to this method, a nanoparticle layer comprised of fine disordered alloy particles of the order of nanometers and an organic compound is formed on a substrate. The particles are irradiated with infrared laser to heat and order them. When the particles start getting ordered, a magnetic field is simultaneously applied externally in a direction inclined from the direction normal to the film plane, thereby causing the easy magnetization direction of the particles to be oriented in the magnetic field direction. Thereafter, ultraviolet light is irradiated so that the organic compound is cross-linked and the nanoparticles are fixed.

In this case, the average particle size is not more than 20 nm and the alloy comprises at least one element selected from the group consisting of Fe, Co, Ni, Mn, Sm, Pt, and Pd. The angle formed by the direction of the applied magnetic field and the direction normal to the substrate during the step of applying a magnetic field is not less than 5° and not more than 60°. Examples of the organic compound include oleic acid, carboxylic acid, phosphonic acid, phosphinic acid, sulfonic acid, sulfinic acid, and thiol.

The magnetic recording medium manufacturing apparatus according to the invention for manufacturing such a medium comprises means for irradiating the nanoparticle layer on the substrate in which the nanoparticles are orderly arranged with infrared light to render the nanoparticles into magnetic nanoparticles. It also comprises means for applying a parallel magnetic field to the nanoparticle layer, the magnetic field forming an angle of not less than 5° and not more than 60° with the direction normal to the substrate, thereby controlling the direction of the magnetization of the magnetic nanoparticles in substantially one direction. The apparatus further comprises means for irradiating the nanoparticle layer with ultraviolet light to cross-link the organic compound, and means for shifting the position of irradiation of infrared light and ultraviolet light on the substrate.

The magnetic recording medium and the magnetic recording apparatus according to the invention are not limited to magnetic disc apparatus for recording a rotating, disc-shaped substrate. The invention can be applied to any recording apparatus in which the position of the head relative to the medium is moved, including a magnetic tape apparatus.

By utilizing the magnetic recording medium according to the invention, improved resolution and S/N can be obtained without adversely affecting the thermal stability. Further, by mounting the magnetic recording medium according to the invention, a magnetic recording apparatus with an improved areal density can be provided.

DESCRIPTION OF PREFERRED EMBODIMENTS

The invention will be hereafter described by way of preferred embodiments with reference made to the drawings.

(Embodiment 1)

Figure 1:
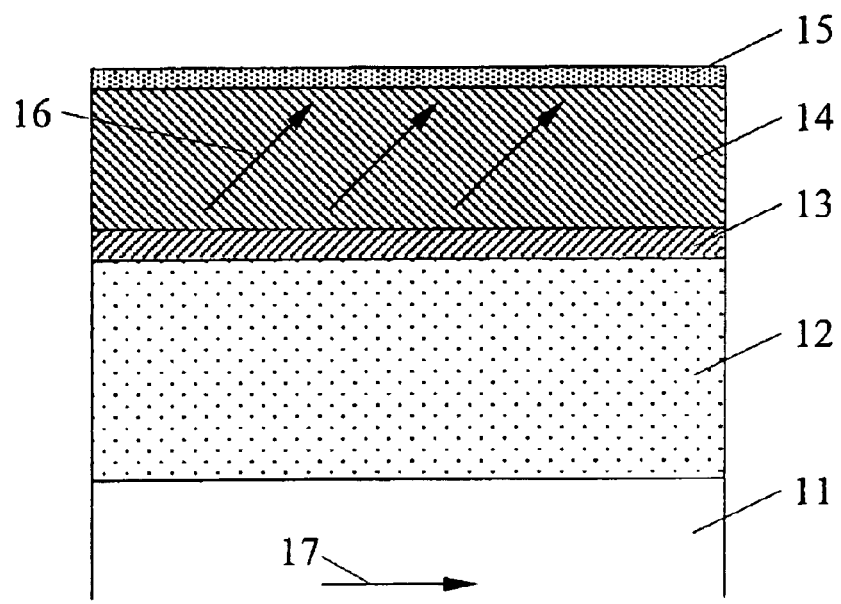
FIG. 1 shows a cross-sectional view of a magnetic recording medium according to an embodiment of the invention.

FIG. 1 schematically shows a cross-section of an example of the magnetic recording medium according to the invention. A soft magnetic underlayer 12 is disposed on a substrate 11. A recording layer 14 is disposed on the soft magnetic underlayer 12 via an intermediate layer 13. A protective layer 15 is disposed on the surface of the recording layer 14. The direction of easy magnetization 16 in the recording layer is inclined away from a line normal to the medium toward the direction of medium transportation 17.

Figure 2:
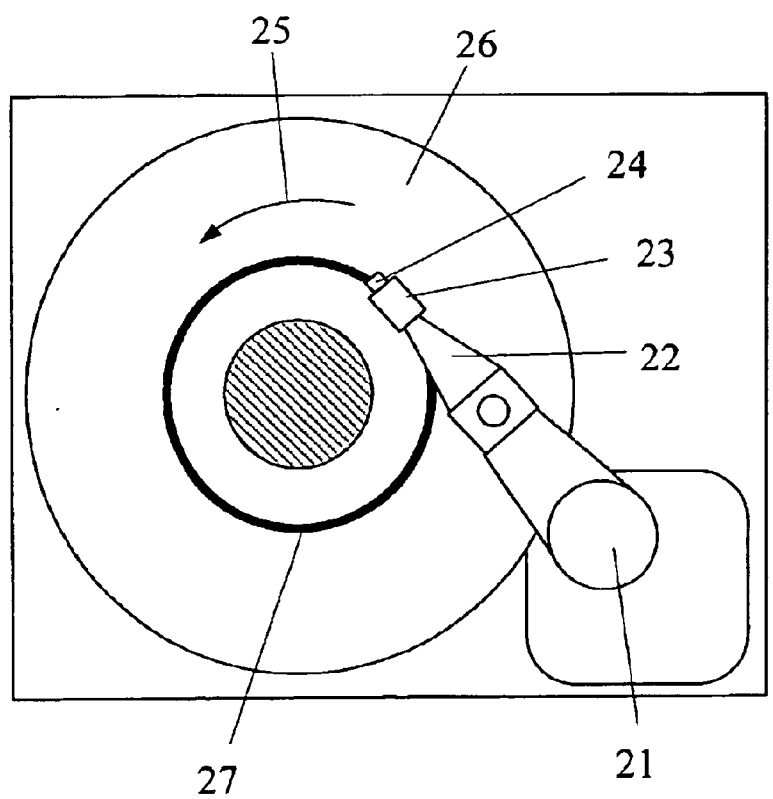
FIG. 2 schematically shows a magnetic disc apparatus according to an embodiment of the invention.

FIG. 2 shows an example of the magnetic recording apparatus according to the invention. A slider 23 is fixed at the tip of a suspension arm 22 supported by a rotary actuator 21. At the end of the slider 23 is mounted a head element 24 that records or reproduces information on a magnetic recording medium 26 rotating in a rotation direction 25 as shown. The head element 24 includes an SPT head as a write head and a magnetoresistive head as a read head. The head element 24 can be transported and positioned at different radial positions on the disc by rotating the rotary actuator 21. Concentric recording tracks 27 are formed on the medium.

Figure 3:
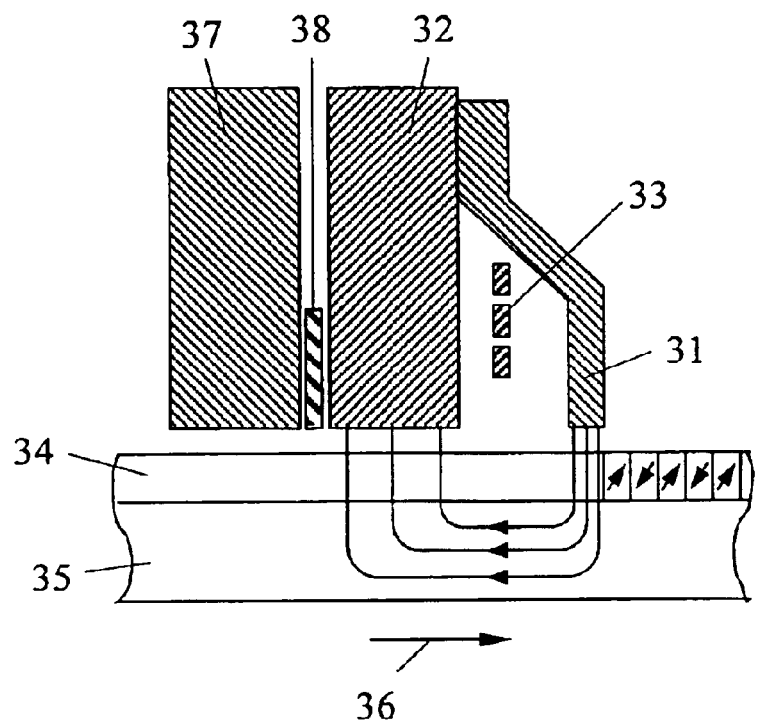
FIG. 3 schematically illustrates the arrangement of the head and the medium in the magnetic recording process in an embodiment of the invention.

FIG. 3 shows the arrangement of the head and the medium during a magnetic recording process in an embodiment of the invention. The head includes a write head (SPT head) comprised of a main pole 31, an auxiliary pole 32 and a coil 33. It also includes a read head having a magnetoresistive film 38 sandwiched between a pair of shields 32 and 37, one of which is doubled by the auxiliary pole. The thus constructed head is disposed opposite a magnetic recording medium including a recording layer 34 and a soft magnetic underlayer 35. As the coil 33 is energized, a vertical magnetic field is created between the tip of the main pole 31 and the soft magnetic underlayer 35, thus recording the recording layer 34 of the magnetic recording medium. The magnetic flux flowing into the soft magnetic underlayer 35 is then returned to the auxiliary pole 32, creating a magnetic circuit. Recording takes place while varying the relative positions of the medium and the head. With the head fixed and the medium moving, when the recording track direction is from the upstream of a medium transport direction 36 to the downstream thereof, and when the direction of easy magnetization is from the back surface of the recording layer toward the upper surface thereof, the head is disposed such that a projection of the easy magnetization direction on the medium plane substantially coincides with the recording track direction. Because, strictly speaking, the recording tracks are concentric circles about the center of rotation of the medium, the recording track direction as used herein refers to the direction of a tangent to a recording track at a given point.

Figure 4:
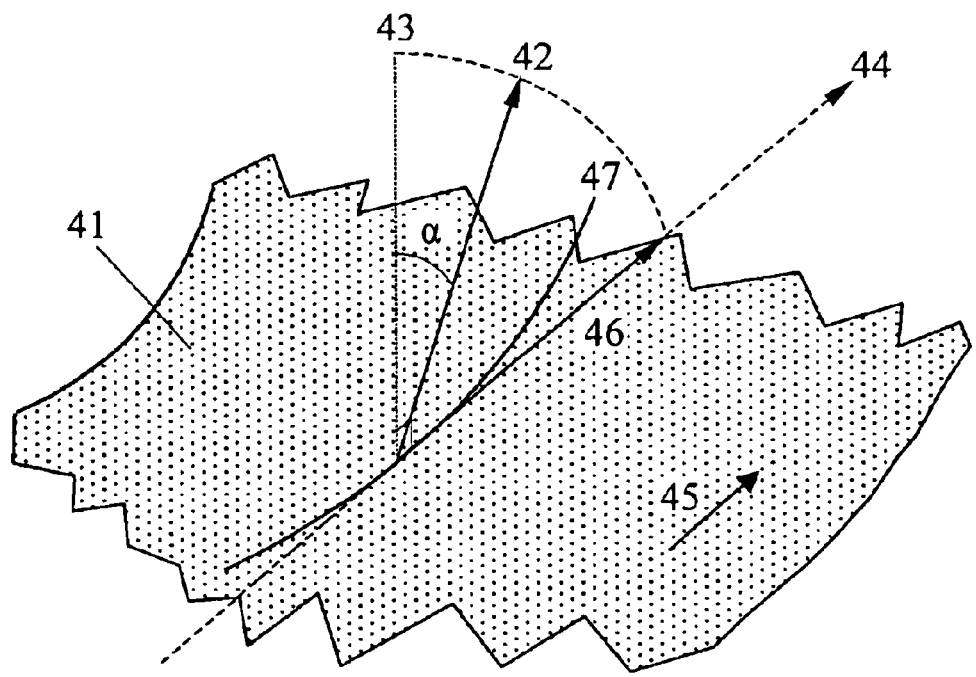
FIG. 4 schematically shows the easy magnetization direction and the medium transportation direction of the magnetic recording medium according to an embodiment of the invention.

FIG. 4 shows a direction 42 of easy magnetization of a magnetic recording medium 41 used in the present embodiment and the direction of transportation of the medium. In the embodiment, the direction 42 of easy magnetization of the magnetic recording medium 41 is inclined from a normal direction 43 of the medium by an angle α. When the easy magnetization direction is from the back surface of the recording layer toward the upper layer thereof, and a direction 44 of recording tracks is from the upstream of a direction 45 of transportation of the magnetic recording medium toward the downstream thereof, a direction 46 of a projection of the easy magnetization direction 42 on the magnetic recording medium plane substantially coincides with the recording track direction 44. The recording track direction 44 is along a line tangent to a recoding track 47 that is concentric with the disc-shaped magnetic recording medium 41.

Figure 5:
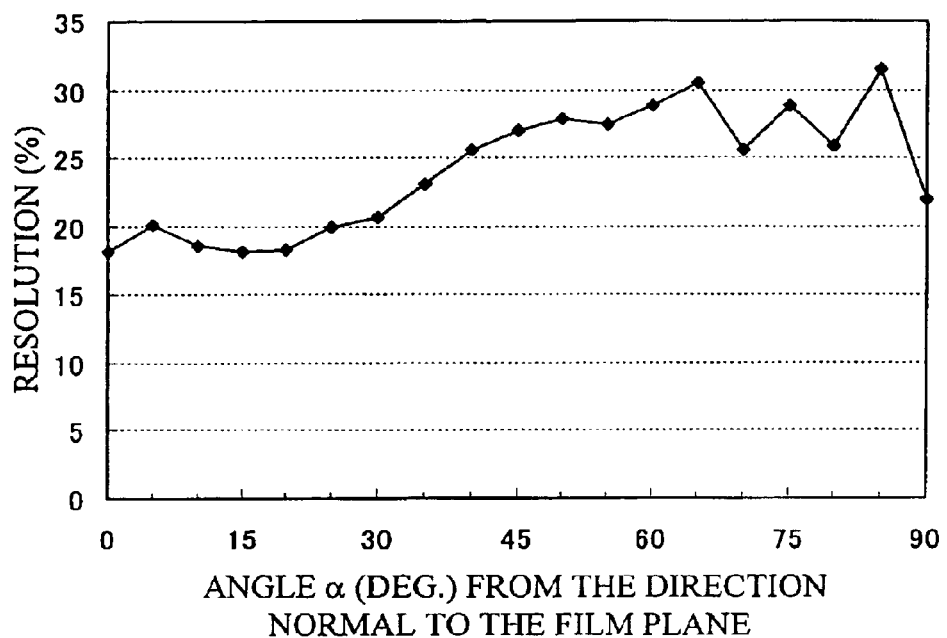
FIG. 5 is a chart showing the variation of resolution relative to the easy magnetization direction in an embodiment of the invention.
Figure 6:
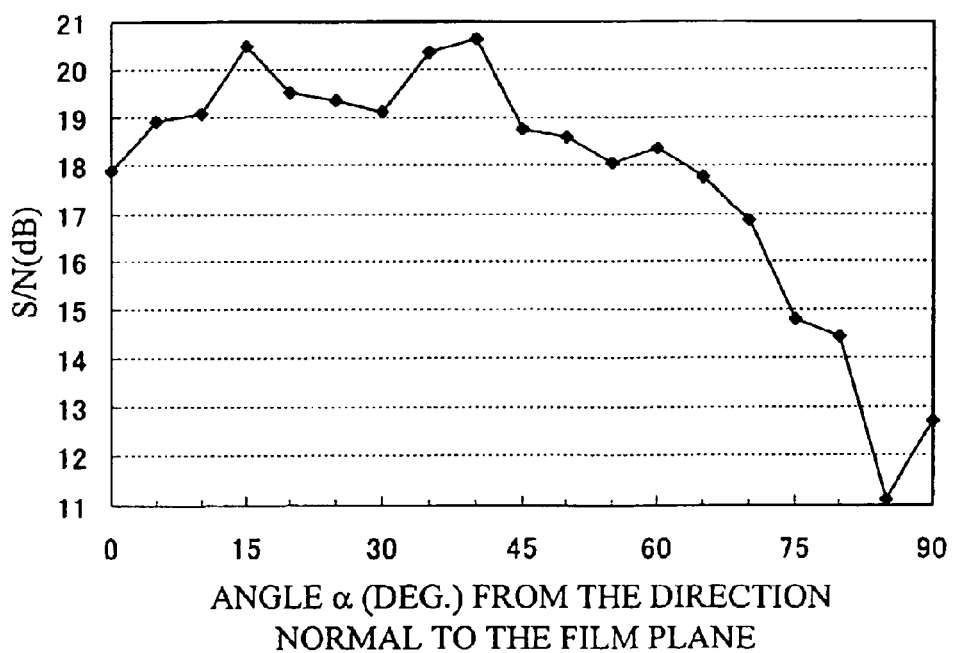
FIG. 6 is a chart showing the variation of S/N relative to the easy magnetization direction in an embodiment of the invention.

FIGS. 5 and 6 show the results of computer simulation of write/read characteristics when the angle α between the easy magnetization direction and the normal direction of the magnetic recording medium was varied. Computation conditions included: an average particle diameter 12.7 nm of the magnetic particles in the recording layer; recoding layer film thickness 20 nm; magnetic anisotropy constant $1.3 \times 10^5$ J/m$^3$; saturation magnetization 0.314 T; underlayer thickness 100 nm; underlayer saturation flux density 1.8 T; underlayer relative permeability 100; main-pole width 150 nm; main-pole thickness 400 nm; head-media magnetic spacing 15 nm; and head-medium relative speed 20 m/s. A low-density recording with a bit length 152 nm and a high-density recording with a bit length 38 nm were conducted to obtain the resolution, which is the percentage of high-density output to low-density output, and the S/N ratio, which is the ratio in dB of low-density output to high-density noise. The head field strength was 939 kA/m.

FIG. 5 shows the resolution for the angle α, while FIG. 6 shows S/N for the angle α. The resolution improved gradually in α≧25° against the value at α=0°. On the other hand, S/N improved in 5°≦α≦55° over α=0°. Thus, it was revealed that the present invention can provide an improved S/N when the angle α between the easy magnetization direction and the normal direction of the magnetic recording medium is in the range between 5° and 55°. Particularly, both the resolution and S/N can be improved in the range of α between 25° and 55°. Why the resolution and S/N improve the greater the value of α is not clear; presumably, it has to do with a change in the required recording magnetic field.

Figure 7:
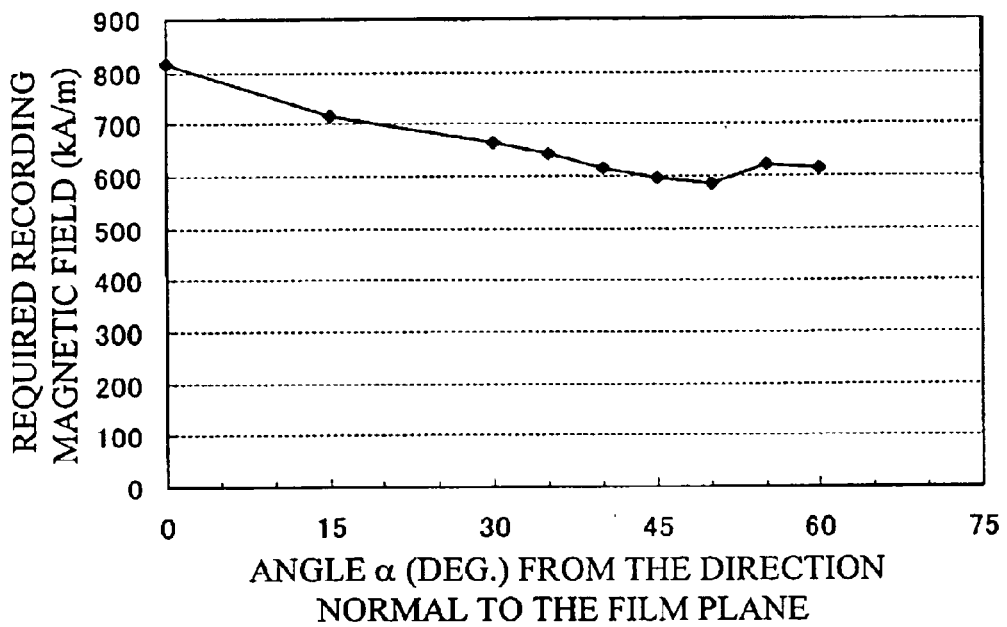
FIG. 7 is a chart showing the variation of the required recording magnetic field relative to the easy magnetization direction in an embodiment of the invention.

FIG. 7 plots the required recording magnetic field against the angle α. The required recording magnetic field is herein defined as the head field strength with which an 80% reproduced output can be obtained with respect to a maximum reproduced output value determined by varying maximum value of the head field strength. The bit length was 152 nm. The required recording field strength monotonously decreased in the range 0°≦α≦50°. The maximum recording field had a constant value in each case when the resolution and S/N were estimated. Thus, the smaller the required recording field, the greater was the relative recording field strength during the estimation of the resolution and S/N, which is believed to be responsible for the improvements in the resolution and S/N.

Thus, in accordance with the invention, S/N can be improved when the angle α between the easy magnetization direction and the normal direction of the magnetic recording medium is in the range 0°≦α≦55°. Particularly, both the resolution and S/N can be improved in the range 25°≦α≦55°. For example, when α=40°, the resolution increased by a factor of 1.4 and S/N improved by 3 dB as compared with when α=0°, that is when the easy magnetization direction is along the normal direction of the magnetic recording medium. Further, the thermal stability of these two media, when expressed as the ratio of reproduced output after 100 hours to that 10 seconds after recording, was 0.88 in each case, and thus there was no difference.

(Embodiment 2)

Using the same magnetic recording medium as in Embodiment 1, when the direction of easy magnetization was from the back surface of the recording layer toward the front surface thereof, and when the recording track direction was from the upstream of the direction of transportation of the magnetic recording medium toward the downstream thereof, the resolution and S/N were estimated with varying angles β between the direction of the projection of the easy magnetization direction on the magnetic recording medium plane and the recording track direction.

Figure 8:
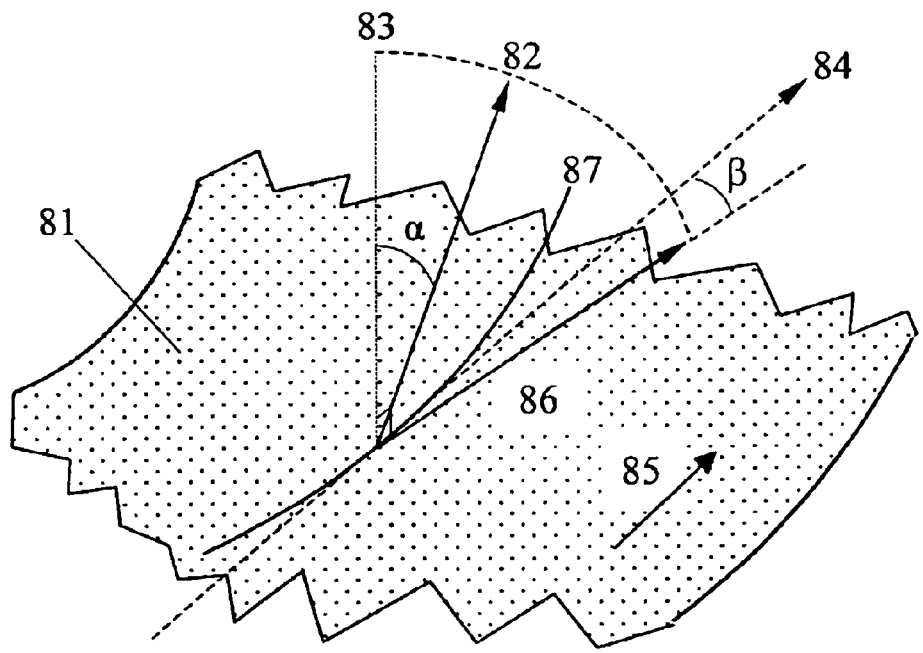
FIG. 8 shows the easy magnetization direction of a medium and the medium transportation direction in an embodiment of the invention.

FIG. 8 shows an easy magnetization direction 82 and a medium transportation direction 85 of the magnetic recording medium. The easy magnetization direction 82 is inclined by an angle α from a normal direction 83 of the medium. When the easy magnetization direction 82 was from the back surface of the recording layer toward the upper surface thereof, and when the recording track direction 84 was from the upstream of the medium transportation direction 85 toward the downstream thereof, an angle β was formed between a direction 86 of the projection of the easy magnetization direction on the magnetic recording medium plane and the recording track direction 84. The recording track direction 84 was along a line tangent to a recording track 87 that is concentric with the disc-shaped magnetic recording medium 81. The angle α between the easy magnetization direction and the normal direction of the medium was fixed at 45°.

Figure 9:
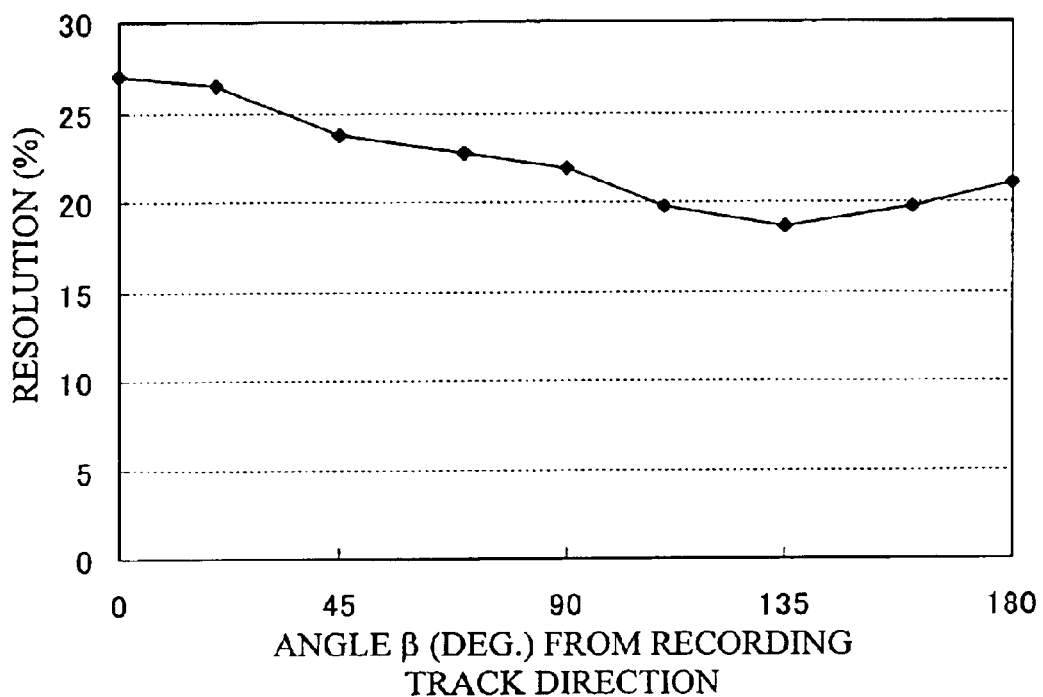
FIG. 9 is a chart showing the variation of resolution relative to the easy magnetization direction in an embodiment of the invention.
Figure 10:
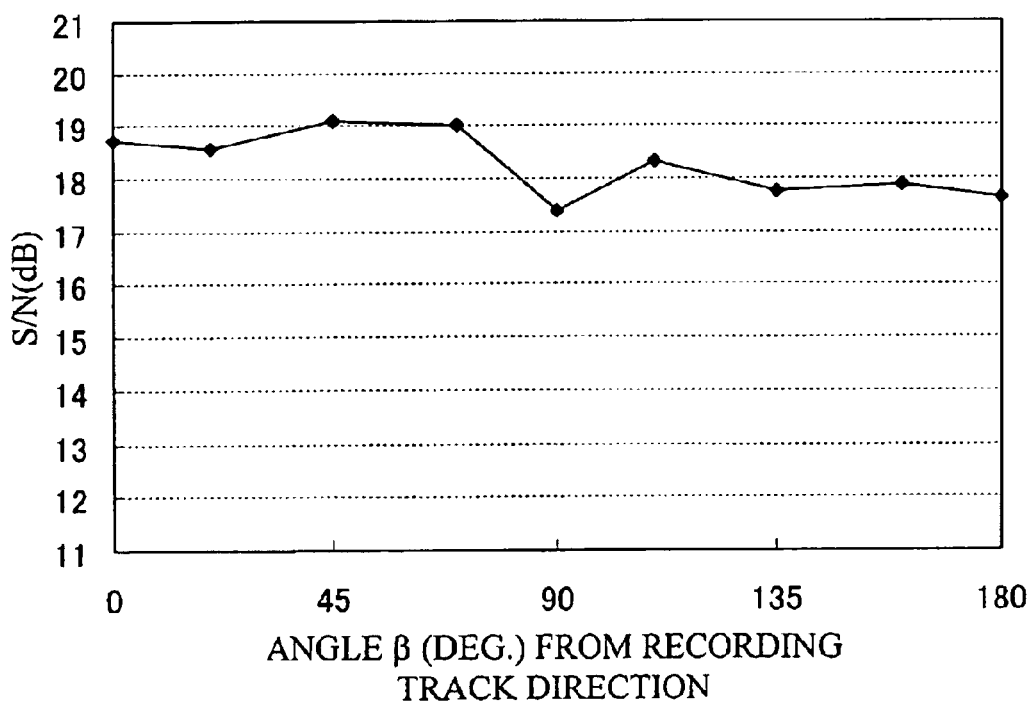
FIG. 10 is a chart showing the variation of S/N relative to the easy magnetization direction in an embodiment of the invention.

FIG. 9 plots the resolution against the angle β, and FIG. 10 plots S/N against the angle β. As shown in FIG. 9, the resolution is highest in the range 0°≦β≦20°. While the resolution monotonously decreased in the range 20°≦β≦135°, it was better in the range 0°≦β≦110° than the resolution when α=0° shown in FIG. 5. FIG. 10 shows that S/N was high in the range 0°≦β≦70°. Thus, it was revealed that both the resolution and S/N can be improved in the range 0°≦β≦70°. It can also be seen that the resolution and SIN are lower when β=180° than when β=0°. When β=180°, the easy magnetization direction is inclined in the opposite direction to the easy magnetization direction according to the invention. Specifically, this is the case where, when the easy magnetization direction is from the back surface of the recording layer toward the upper surface thereof, and when the recording track direction is from the upstream of the direction of transportation of the medium toward the downstream thereof, the direction of the projection of the easy magnetization direction on the medium plane is antiparallel to the recording track direction. This arrangement is preferable when recording an obliquely evaporated tape using a ring head.

The reason why it is effective in the present invention to reverse the direction of inclination of the easy magnetization direction that is preferable in the combination of the obliquely evaporated tape and a ring head is not clear. In the present invention, the recording layer of the magnetic recording medium includes a soft magnetic underlayer, as shown in FIG. 3, and, during the write process, a steep magnetic field is applied substantially along the normal direction of the medium from the main pole of the SPT head toward the soft magnetic underlayer thereof. Presumably, these features of the present invention combine to create an effect not found in the case of the combination of a tape medium having no soft magnetic underlayer and a ring head.

Thus, in accordance with the invention, both the resolution and S/N can be improved when the angle β between the direction of the projection of the easy magnetization direction, inclined in the opposite direction to that in the obliquely evaporated tape, on the medium plane and the recording track direction is in the range 0°≦β≦70°. Particularly, a greater improvement in resolution can be obtained when the range is 0°≦β≦20°. For example, when β=20° and α=45°, the resolution can be improved by a factor of 1.5 as compared with the case when α=0°, that is when the easy magnetization direction is along the normal direction of the magnetic recording medium. The thermal stability of these two media, when expressed by the ratio of reproduced output after 100 hours to that 10 seconds after recording was 0.89 and 0.88, for the former and the latter, respectively, thus showing little difference.

(Embodiment 3)

Figure 11:
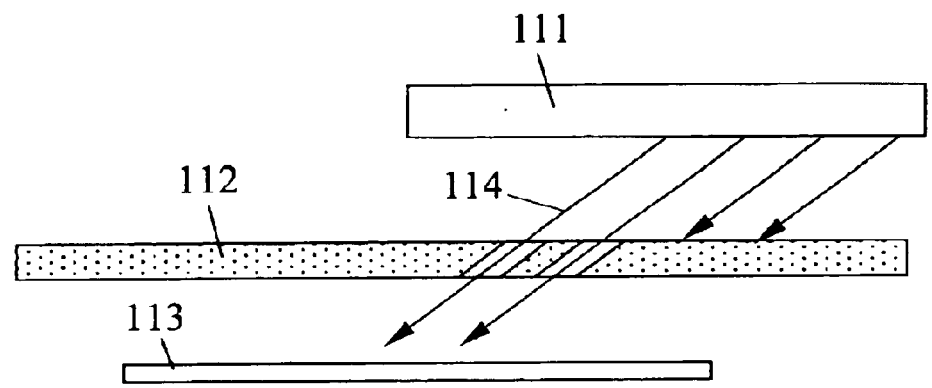
FIG. 11 schematically shows the arrangement of a target, a mask plate, and a substrate in an embodiment of the invention.

A magnetic recoding medium similar to the one in Embodiment 1 was produced. Films were formed by sputtering. During the formation of a recording film, a mask plate for limiting the direction of incoming particles was placed between a target and a substrate, such that only particles traveling from a direction that is inclined from the normal direction of the substrate toward one direction were allowed to be deposited. The mask plate may be either propeller-shaped or one having holes with their central axes inclined with respect to the normal direction of the plate, for example. In the present embodiment, the latter was used. FIG. 11 shows the arrangement of a target 111, a mask plate 112, and a substrate 113, as well as a direction 114 of the incoming particles. A uniform film was obtained by depositing a recording film while rotating the target and the mask plate. A soft magnetic underlayer was formed by a FeTaC layer of film thickness 400 nm. An intermediate layer was formed by a NiTaZr layer of film thickness 5 nm. The recording film was formed by a CoCrPtB layer of film thickness 20 nm. The intermediate film has the function of improving the crystalinity and orientation of the recording film, as well as preventing the atomic diffusion between the soft magnetic underlayer and the recording film. On the surface of the recording film was formed a carbon protective film of film thickness 2 nm. The substrate temperature was set at 373 K and the argon gas pressure during sputtering was set at 1 Pa. In the present embodiment, the central axes of the holes in the mask plate were inclined by 50° with respect to the normal direction of the plate, and the direction of the projection of each central axis on the substrate plane was inclined to coincide with a line tangent to the circumference of the substrate.

The crystalinity of the thus produced magnetic recording medium was cross-sectionally observed with an electron microscope. A sample was prepared from a small piece cut out from the medium in a direction parallel to a tangent to its circumference. Observation of the sample revealed the formation of columnar crystal particles in a direction inclined away from the direction normal to the film plane. The angle of inclination was about 45°. The magnetic recording medium was then cut into several small pieces. Then, the torque curve concerning the rotation of magnetic field in a plane containing the normal direction of the medium and the circumference thereof was measured. Results indicated that the easy magnetization direction was in a direction about 38° away from the normal direction of the medium on average. When the thus produced magnetic recording medium was recorded and reproduced using an SPT head, the resolution was improved by a factor of 1.3 and S/N by 2.6 dB as compared with a perpendicular magnetic recording medium that was produced without using a mask plate.

(Embodiment 4)

A magnetic recording medium similar to the one used in Embodiment 2 was produced. The recording layer was formed by a FePt-alloy nanoparticle medium. FePt is an intermetallic compound having an $L1_0$-type crystal structure that exhibits ferromagnetism by ordering a disordered alloy with thermal treatment. In the present embodiment, a soft magnetic underlayer FeTaC was formed to a film thickness of 200 nm and an intermediate layer of NiTaZr was formed to a film thickness of 4 nm on a substrate by sputtering in advance. Then, a nanoparticle film comprised of disordered alloy particles with an average particle size of about 9 nm and an organic compound of oleic acid was formed thereon.

Figure 12:
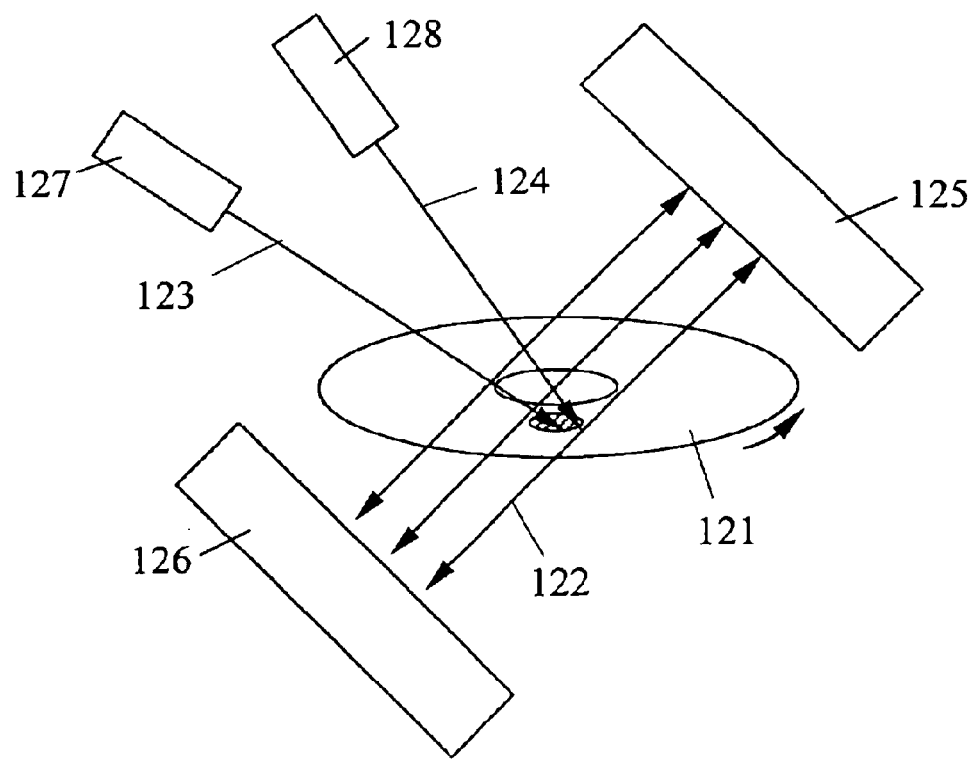
FIG. 12 schematically shows the arrangement of the direction of application of a magnetic field and the magnetic recording medium in an embodiment of the invention.

As schematically shown in FIG. 12, while applying a parallel magnetic field 122 to the substrate 121 from an external magnetic field applying apparatus 125 and 126, the particles were irradiated with an infrared laser 123 of wavelength 800 nm from an infrared light irradiating apparatus 127. The particles were thus heated and ordered such that their magnetic anisotropy was oriented in the direction of the magnetic field. Immediately thereafter, the substrate 121 was irradiated with an ultraviolet light 124 of wavelength 200 nm from an ultraviolet light irradiating apparatus 128, so that the organic compound was cross-linked and the particles were anchored, thus controlling the magnetic anisotropy. The magnitude of the magnetic field was 10 kOe, and the direction of its application was inclined by 60° from the normal direction of the medium. Where the infrared laser and the ultraviolet light were irradiated, the direction of magnetic field application as projected on the medium plane was 20° off the direction of the circumference of the medium. Irradiation was conducted while rotating the medium and moving the irradiation position along the radius, so that the entire surface could be uniformly irradiated.

The resultant magnetic recording medium was cut into several small pieces. A torque curve was measured by rotating the magnetic field in a plane including the normal direction of the medium and the direction rotated by 20° from the direction of circumference. The result revealed that the easy magnetization direction was in a direction on average approximately 55° off the normal direction of the medium. Namely, in order to make the easy magnetization direction of the medium 55° off the normal direction of the medium by the method of the present embodiment, it was necessary to make the magnetization application direction inclined from the normal direction of the medium by 60°. In order to make the easy magnetization direction of the medium 5° off the normal direction of the medium, it was sufficient to incline the magnetization application direction from the normal direction of the medium by the same 5°. Thus, in order to manufacture a magnetic recording medium with the easy magnetization direction ranging from 5° to 55° with respect to the normal direction of the medium, the apparatus for manufacturing the magnetic recording medium of the invention was adapted such that it can vary the direction of magnetic field application in the range between 5° and 60°.

When the magnetic recording medium produced by the above-described method was recorded and reproduced using an SPT head, resolution was improved by a factor of 1.6 and S/N by 0.6 dB as compared with a perpendicular magnetic recording medium in which a magnetic field had been applied perpendicular to the medium plane during manufacture.

Magnetic recording media were prepared by the same method using different materials for the recording layer. To determine the degree of improvement, the resolution and S/N of the media were compared with those of perpendicular magnetic recording media using the same materials in which the magnetic field was applied perpendicular to the medium plane during preparation. The results are shown in Table 1.

TABLE 1

Comparison of improvements in resolution and S/N depending on the recording layer material.

| Recording layer material | Ratio of improvement of resolution (−) | Ratio of improvement of S/N (dB) |
| --- | --- | --- |
| FePt | 1.6 | 0.6 |
| CoPt | 1.3 | 0.3 |

TABLE 1-continued

Comparison of improvements in resolution and S/N depending on the recording layer material.

| Recording layer material | Ratio of improvement of resolution (-) | Ratio of improvement of S/N (dB) |
|---|---|---|
| CoPd | 1.2 | 0.4 |
| SmCo | 1.2 | 0.5 |
| FeNiPt | 1.1 | 0.3 |
| FeMnAl | 1.1 | 0.0 |

(Embodiment 5)

Figure 13:
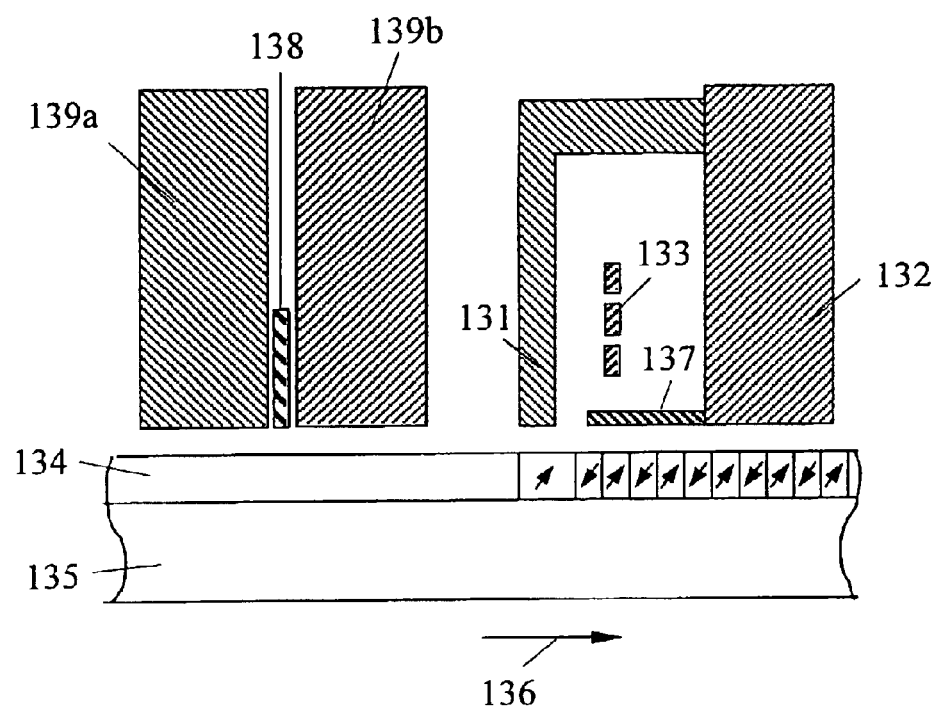
FIG. 13 schematically shows a write-read head.
Figure 14:
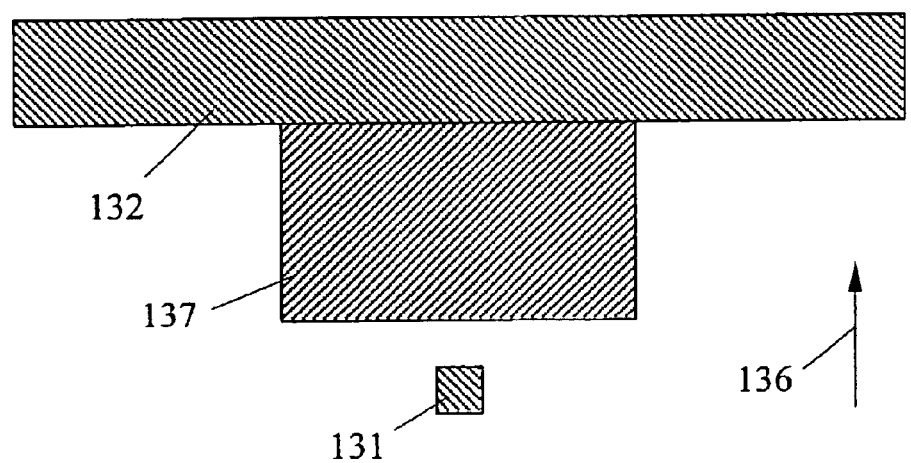
FIG. 14 schematically shows the arrangement of the poles of the head as seen from the air bearing surface.

In a magnetic recording apparatus utilizing a magnetic recording medium similar to the one according to Embodiment 1, a write-read head having a structure as schematically shown in FIG. 13 was employed. The head included a write head made up of a main pole 131, an auxiliary pole 132, and a coil 133, and a read head with a structure in which a magnetoresistive film 138 was sandwiched between shields 139a and 139b. The head was disposed opposite a magnetic recording medium having a recording layer 134 and a soft magnetic underlayer 135. When the recording track direction was from the upstream of a direction 136 of transportation of the medium to the downstream thereof, and when the easy magnetization direction of the recording layer 134 was from the back surface of the recording layer toward the upper surface thereof, the direction of the projection of the easy magnetization direction on the medium plane substantially coincided with the direction of the recording tracks. As opposed to Embodiment 1, the auxiliary pole 132 was disposed downstream of the medium transportation direction 136 relative to the main pole 131. A shield 137 made of a soft magnetic thin film was connected to the auxiliary pole 132 and it extended to the vicinity of the main pole 131. FIG. 14 schematically shows the arrangement of the poles of the head as seen from the air bearing surface (ABS), or the air bearing surface of the magnetic head. As shown, the head is characterized in that the shield 137 is wider than the edge of the opposite main pole 131 downstream of the medium transportation direction 136.

The write-read characteristics of the head with the thus arranged magnetic poles when used for recording the same medium as that of Embodiment 1 were estimated by computer simulation. Computation conditions included an average particle size 12.7 nm of the magnetic particles in the recording layer; recording layer thickness 20 nm; magnetic anisotropic constant $1.3 \times 10^5$ J/m$^3$; saturation magnetization 0.314 T; underlayer thickness 100 nm; underlayer saturation flux density 1.2 T; underlayer relative permeability 500; main pole width 160 nm; main pole thickness 160 nm; head-medium magnetic spacing 15 nm; and head-medium relative speed 20 m/s. In FIG. 14, the interval between the main pole 131 and the shield 137 was 40 nm, the shield 137 was 4.9 μm in width, 100 nm in thickness, and 2 μm in length in the direction of transportation of the medium. A low-density recording with a bit length 152 nm and a high-density recording with a bit length of 38 nm were carried out to determine the resolution, which is the ratio, in percentage, of the high-density output to the low-density output, and the S/N ratio, which is the ratio, in dB, of the low-density output to the high-density noise. The head magnetic field strength was 724 kA/m. The easy magnetization direction and the medium transportation direction of the magnetic recording medium used in this embodiment were the same as those shown in FIG. 4.

Figure 15:
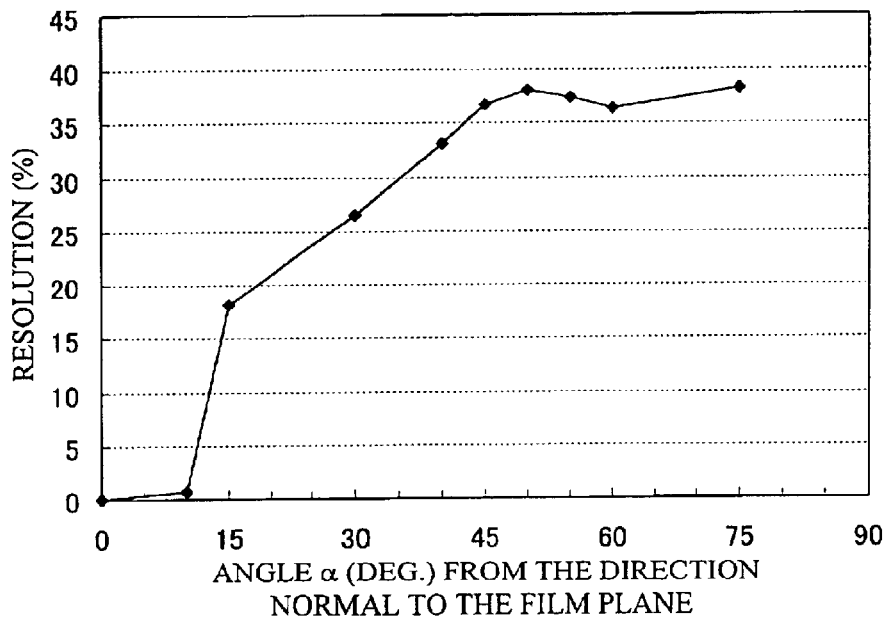
FIG. 15 is a chart showing the variation of resolution relative to angle α.
Figure 16:
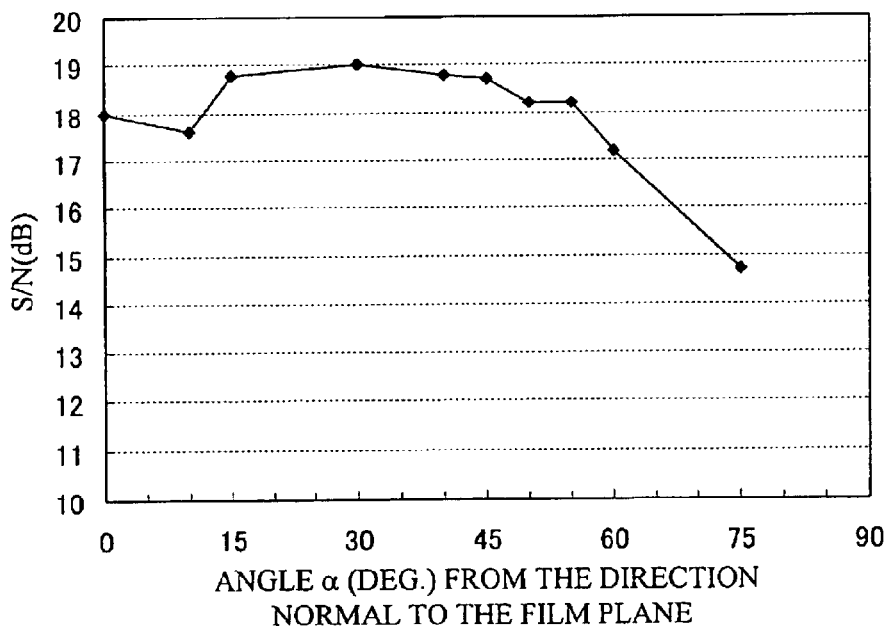
FIG. 16 is a chart showing the variation of S/N relative to angle α.

FIG. 15 shows the resolution against angle α. FIG. 16 shows the S/N against angle α. The resolution was almost zero when α was 0°. Namely, it was revealed that the head according to the present embodiment experienced difficulty recording the perpendicular medium, in which the easy magnetization direction exists in a vertical direction. However, as the easy magnetization direction of the recording layer was inclined away from the normal direction of the magnetic recording medium, recording became possible. The resolution improved up to 18% or more when $\alpha \geq 15°$. The S/N improved in the range $15° \leq \alpha \leq 55°$ over that (17.9 dB; see FIG. 6) of the case where the medium with α=0° was recorded using the conventional SPT head. Thus, it was revealed that in accordance with the present embodiment, the S/N and resolution can be improved when the angle α between the easy magnetization direction and the normal direction of the medium was in the range between 15° and 55°.

The reason that no resolution was obtained in the range $0° \leq \alpha \leq 15°$ is presumably due to the weakness of the head magnetic field strength. As shown in FIG. 7, the required recording magnetic field against the angle α exceeds the head magnetic field strength 724 kA/m of the present embodiment in the range $0° \leq \alpha \leq 15°$. Thus, no saturation recording is possible in this range due to lack of head magnetic field strength. It could be possible to achieve saturation recording on a medium with $0° \leq \alpha \leq 15°$ using the head of the embodiment if the magnetic anisotropy of the medium is reduced to thereby lower the required recording magnetic field. This is not appropriate, however, as it could worsen thermal stability. Accordingly, when the head of the present embodiment is used, the range $15° \leq \alpha \leq 55°$ is appropriate. For example, when α=45°, the resolution was as much as 36.8%, and S/N improved by 0.7 dB over that of the case where the medium with α=0° was recorded using the conventional SPT head. Further, the thermal stability of the medium, when expressed as the ratio of the reproduced output after 100 hours to the reproduced output 10 seconds after end of recording, was 0.89 in both cases, irrespective of α.

Figure 19:
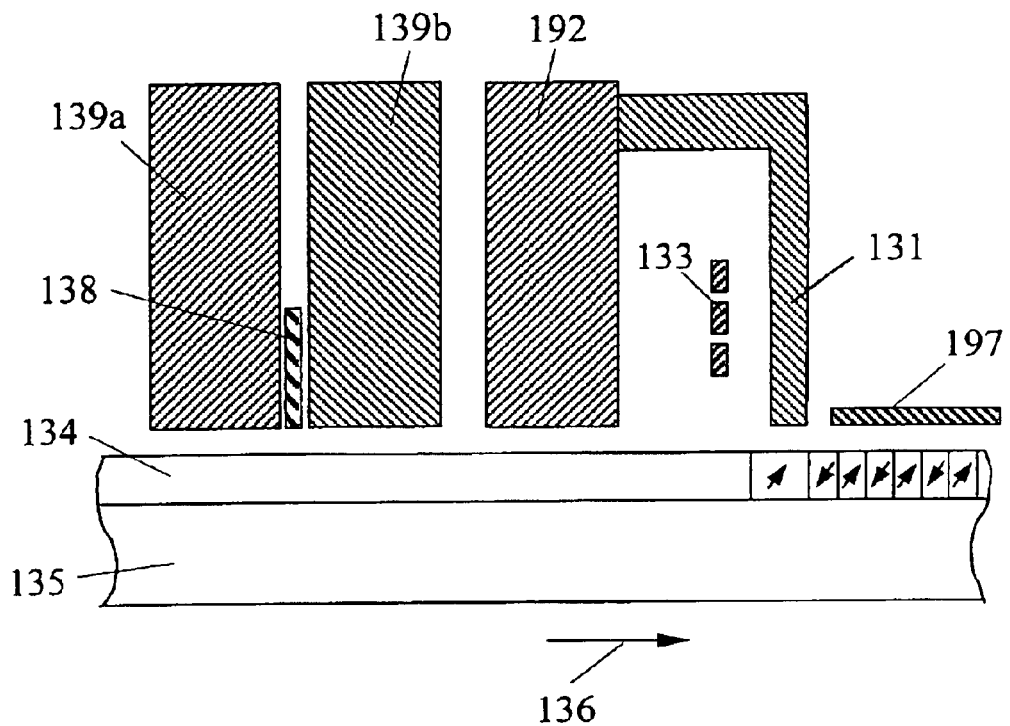
FIG. 19 shows a modification of the write-read head in which the position of an auxiliary pole is different.
Figure 20:
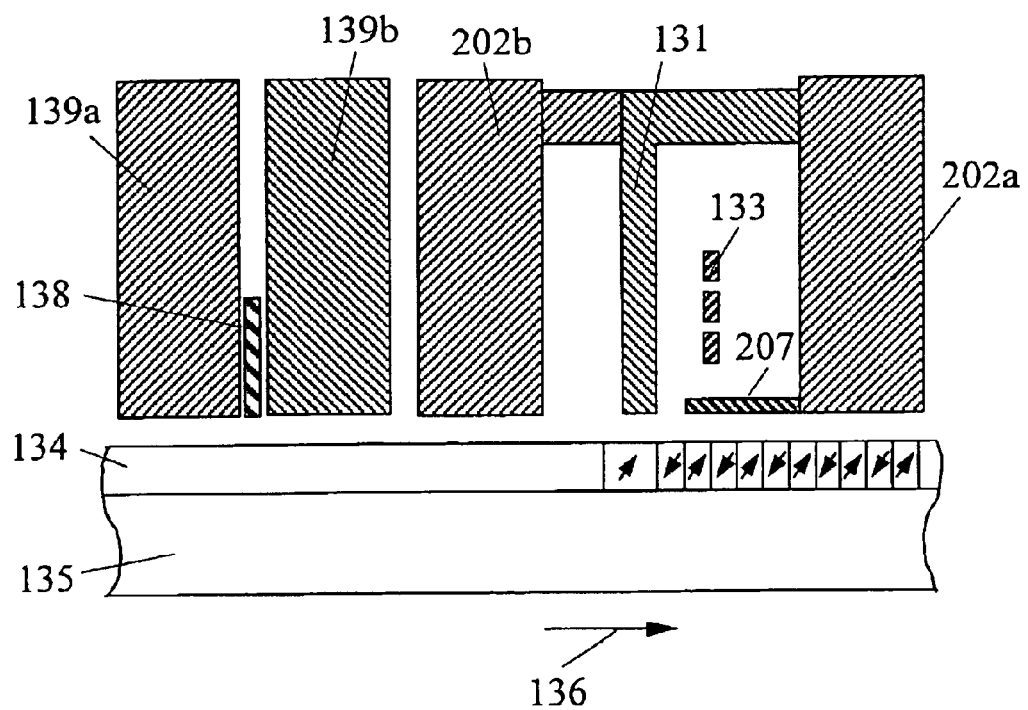
FIG. 20 shows another modification of the write-read head in which the position of an auxiliary pole is different.

FIGS. 19 and 20 show modifications of the write-read head with different auxiliary pole positions. Functional parts similar to those of FIG. 13 are designated with similar numerals and will not be described in detail. In the case of the magnetic head of FIGS. 13 and 14, the auxiliary pole 132 is disposed downstream of the medium transportation direction 136 relative to the main pole 131. In the magnetic heads of FIGS. 19 and 20, on the other hand, auxiliary poles 192, 202a and 202b are positioned either upstream or both upstream and downstream of the medium transportation direction. Further, in the example of FIG. 19, a downstream shield 197 does not constitute a magnetic circuit, whereas a shield 207 in the example of FIG. 20 constitutes a magnetic circuit. In the case of FIG. 19, the length of the shield 197 in the medium transportation direction should preferably be set large, between 3 to 5 μm, for example. This head proved capable of providing results similar to those described above.

(Embodiment 6)

Figure 17:
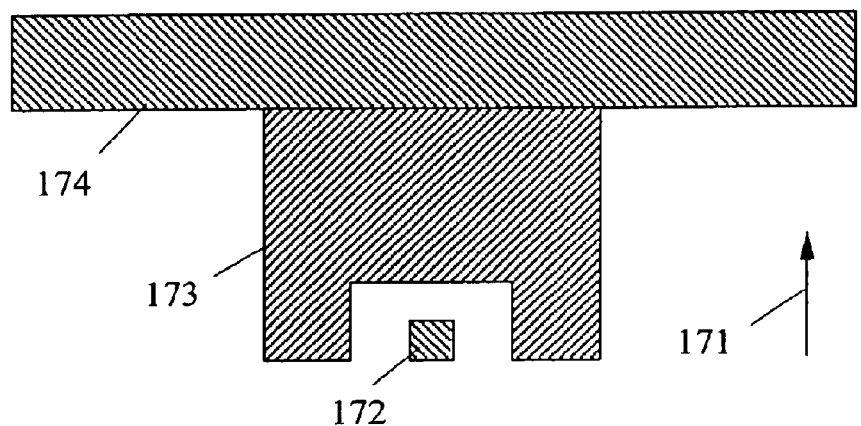
FIG. 17 schematically shows the shape of a main pole and a shield as seen from the air bearing surface.
Figure 18:
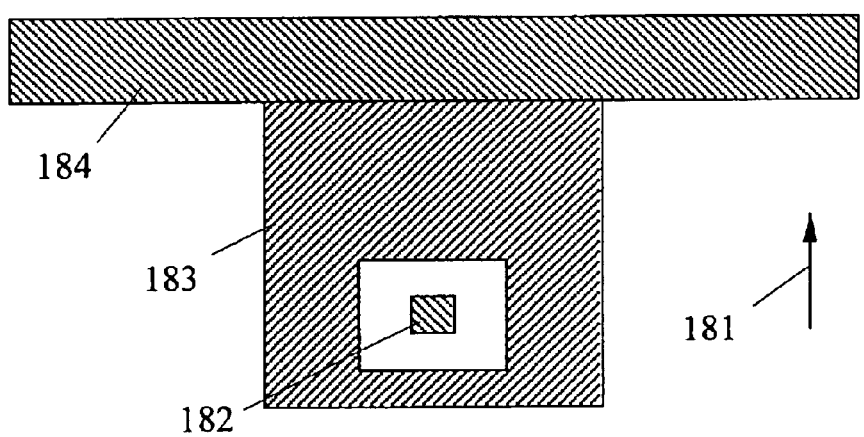
FIG. 18 schematically shows the shape of a main pole and a shield as seen from the air bearing surface.

In a magnetic recording apparatus similar to the one of Embodiment 5, a medium with α=45° was used and the write-read characteristics of two kinds of head with different soft magnetic thin-film shield shapes were estimated. FIGS. 17 and 18 each schematically show the shape of the main pole and the shield as seen from the ABS surface (air bearing surface). In the head shown in FIG. 17, a shield 173 extends to the side of a main pole 172. In the head shown in FIG. 18, a shield 183 surrounds the main pole 182. Numerals 174 and 184 designate auxiliary poles and numerals 171 and 181 indicate the medium transportation direction.

The magnetic field strength at the center of the recording layer of the magnetic recording medium decreased as the size of the shield surrounding the main pole increased. While these heads experienced difficulty recording a medium with α=0°, namely the perpendicular medium, in which the easy magnetization direction is vertical, the heads successfully recorded when combined with a medium with α=45°. As compared with the head of Embodiment 5, the head of FIG. 17 had reductions in resolution by 7% and S/N by 1.1 dB. In the case of the head of FIG. 18, the reductions were 12% in resolution and 1.9 dB in S/N. However, as compared with the head of Embodiment 5, the head of FIG. 17 had a track width that was narrower by 15%, and the track width of the head of FIG. 18 was narrower by 21%. Thus, it was revealed that the heads of the present embodiment were suitable for a narrow-track recording.

(Embodiment 7)

In a magnetic recording apparatus similar to the one of Embodiment 5, when the easy magnetization direction was from the back surface of the recording layer toward the front surface thereof, and when the recording track direction was from the upstream of the direction of transportation of the magnetic recording medium toward the downstream thereof, the resolution and S/N were estimated with varying angles β between the direction of the projection of the easy magnetization direction on the medium plane and the recording track direction. The relationship between the easy magnetization direction of the medium and its direction of transportation was the same as that shown in FIG. 8. The shape of the head was that of Embodiment 5 as shown in FIG. 14.

The resolution and S/N were estimated by the same computer simulation as described above. As in Embodiment 5, recording is difficult when α=0°, and recoding became possible as the angle α increased. In this example, comparisons were made at angles β=0°, 90° and 180° when α=45°. As a result, it was revealed that the resolution was highest at 36.8% when β=0°. It was 27.4% when β=90°, and 32.5% when β=180°. S/N was 18.7 dB when β=0°, 17.4 dB when β=90°, and 17.6 dB when β=180°.

A case was also examined where β was different for each crystal particle forming the recording layer of the magnetic recording medium. This means that, although α=45° when the magnetic recording medium was viewed as a whole, β was random. In this case too, recording was possible using the head of the present embodiment, and the resolution was 23.7% and S/N was 18.1 dB. The head of the embodiment provided excellent resolution with little deterioration in S/N regardless of the direction of β. This is presumably due to the very high recording magnetic field gradient of the head. The head is not suitable for recording the perpendicular magnetic recording medium with its easy magnetization direction oriented in the direction of the normal direction of the medium, because its magnetic field strength is lower than that of the conventional SPT head in Embodiment 1. However, the head can record magnetic recording media whose easy magnetization direction is inclined from their normal direction, and the feature of the head, that is the excellent recording magnetic field gradient, can be fully exploited with that type of media.

Thus, the magnetic recording medium according to the invention comprises at least a recording layer in which the easy magnetization direction is inclined from the normal direction of the medium, and a soft magnetic underlayer. The inventive medium, when information is recorded thereon using the SPT head, can provide better resolution and S/N without adversely affecting its thermal stability than the perpendicular magnetic recording medium, in which the easy magnetization direction is parallel to the normal direction of the medium. As a result, the invention can provide a magnetic recording apparatus capable of providing an improved areal density.

The invention provides a method of manufacturing a magnetic recording medium, the method comprising the steps of:

forming a nanoparticle layer by disposing nanoparticles on a substrate, the nanoparticles comprising alloy particles containing at least one element selected from the group consisting of Fe, Co, Ni, Mn, Sm, Pt, and Pd, wherein the alloy particles are coated with an organic compound;

irradiating the nanoparticle layer with infrared light to produce magnetic nanoparticles;

applying a magnetic field to the nanoparticle layer to control the magnetization direction of the magnetic nanoparticles in substantially one direction; and irradiating the nanoparticle layer with ultraviolet light to cross-link the organic compound, wherein the angle formed by the direction of the magnetic field applied in the magnetic field applying step and the direction normal to the substrate is not less than 5° and not more than 60°.

The invention provides a magnetic recording medium manufacturing apparatus comprising:

means for irradiating a nanoparticle layer disposed on a substrate with infrared light to produce magnetic nanoparticles, the nanoparticles comprising alloy particles containing at least one element selected from the group consisting of Fe, Co, Ni, Mn, Sm, Pt, and Pd, wherein the alloy particles are coated with an organic compound;

means for applying a parallel magnetic field to the nanoparticle layer, the magnetic field forming an angle of not less than 5° and not more than 60° with the direction normal to the substrate in order to control the direction of magnetization of the magnetic particles in substantially one direction;

means for applying ultraviolet light to the nanoparticle layer to cross-link the organic compound; and means for shifting the position of irradiation of the infrared light and ultraviolet light on the substrate.

The invention provides a magnetic recording apparatus comprising:

a magnetic recording medium;

a single pole type (SPT) head;

a slider on which the SPT head is mounted;

a suspension arm for securely fastening the slider; and an actuator for supporting the suspension arm, wherein the SPT head can be transported to an arbitrary position on the recording medium by the movement of the actuator where it can record information, and wherein the SPT head comprises at least:

a main pole, an auxiliary pole, and a shield disposed downstream of the direction of transportation of the medium with respect to the main pole and having a wider width than the main pole, wherein the magnetic recording medium comprises at least a soft magnetic underlayer and a recording layer, and wherein the angle formed by the easy magnetization direction of the recording layer and the direction normal to the medium is not less than 15° and not more than 55°.

What is claimed is:

1. A magnetic recording medium comprising at least a soft magnetic underlayer and a recording layer, wherein the angle formed by the direction of easy magnetization of the recording layer and the direction normal to the medium is not less than 5° and not more than 55°, and wherein, when the easy magnetization direction is from a back surface of the recording layer toward a front surface thereof and when the direction of recording tracks is from the upstream of the direction of transportation of the medium toward the downstream thereof, the direction of a projection of the easy magnetization direction on the medium plane substantially coincides with the recording track direction.

2. The magnetic recording medium according to claim 1, wherein the angle formed by the easy magnetization direction of the recording layer and the direction normal to the medium is not less than 25° and not more than 55°.

3. The magnetic recording medium according to claim 1, wherein the angle formed by the direction of a projection of the easy magnetization direction on the medium plane and the recording track direction is not more than 70°.

4. A magnetic recording apparatus comprising:

a magnetic recording medium;

a single pole type (SPT) head;

a slider on which the SPT head is mounted;

a suspension arm for securely fastening the slider; and an actuator for supporting the suspension arm, wherein the SPT head can be transported to an arbitrary position on the recording medium by the movement of the actuator where it can record information, and wherein the magnetic recording medium comprises at least a soft magnetic underlayer and a recording layer, wherein the angle formed by the direction of easy magnetization of the recording layer and the direction normal to the medium is not less than 5° and not more than 55°, and wherein, when the easy magnetization direction is from a back surface of the recording layer toward a front surface thereof and when the direction of recording tracks is from the upstream of the direction of transportation of the medium toward the downstream thereof, the direction of a projection of the easy magnetization direction on the medium plane substantially coincides with the recording track direction.

5. The magnetic recording apparatus according to claim 4, wherein the angle formed by the easy magnetization direction of the recording layer and the direction normal to the medium is not less than 25° and not more than 55°.

6. The magnetic recording apparatus according to claim 4, wherein the angle formed by the direction of a projection of the easy magnetization direction of the recording layer on the medium plane and the recording track direction is not more than 70°.

7. A magnetic recording apparatus comprising:

a magnetic recording medium;

a single pole type (SPT) head;

a slider on which the SPT head is mounted;

a suspension arm for securely fastening the slider; and an actuator for supporting the suspension arm, wherein the SPT head can be transported to an arbitrary position on the recording medium by the movement of the actuator where it can record information, wherein the SPT head comprises at least:

a main pole, an auxiliary pole, and a shield disposed downstream of the direction of transportation of the medium with respect to the main pole and having a wider width than the main pole, and wherein the magnetic recording medium comprises at least a soft magnetic underlayer and a recording layer, wherein when the easy magnetization direction of the recording layer is from a back surface of the recording layer toward a front surface thereof and when the direction of recording tracks is from the upstream of the direction of transportation of the medium toward the downstream thereof, the direction of a projection of the easy magnetization direction on the medium plane substantially coincides with the recording track direction.

8. The magnetic recording apparatus according to claim 7, wherein the angle formed by the easy magnetization direction of the recording layer and the direction normal to the medium is not less than 15° and not more than 55°.

9. The magnetic recording apparatus according to claim 8, wherein the auxiliary pole is located downstream of the direction of transportation of the medium relative to the main pole.

10. The magnetic recording apparatus according to claim 8, wherein the auxiliary pole is located upstream of the direction of transportation of the medium relative to the main pole.

* * * * *